3,315,439
MACHINE FOR HEAT SEALING THERMOPLASTIC BAGS

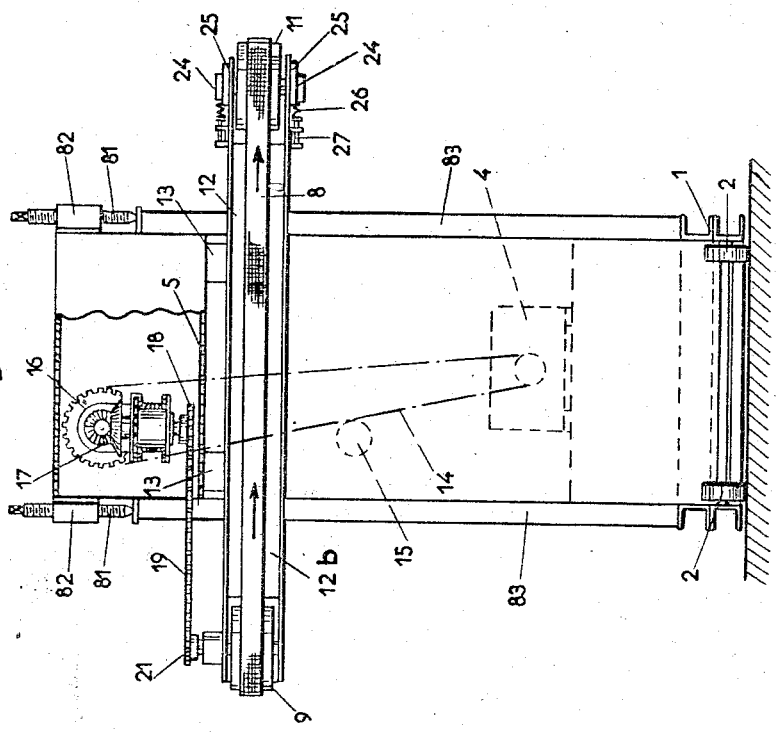
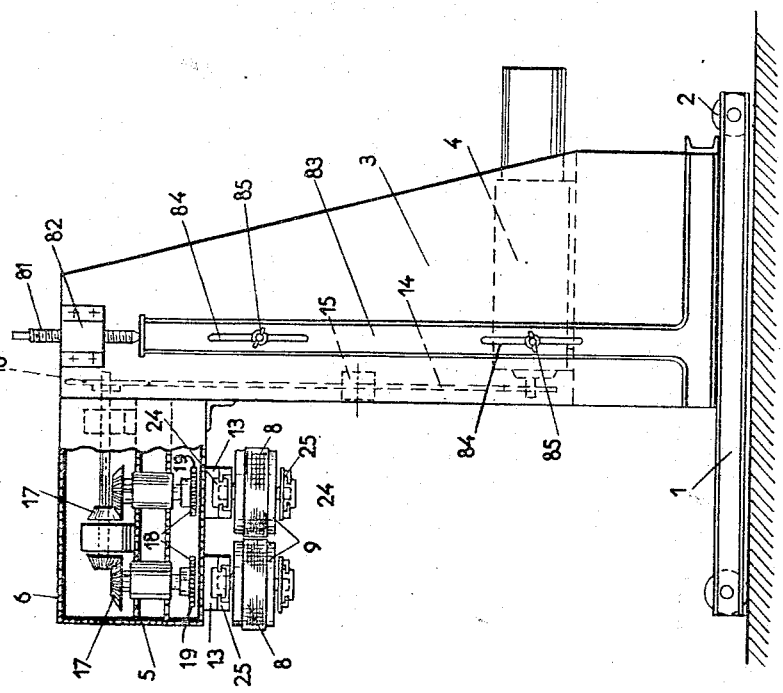

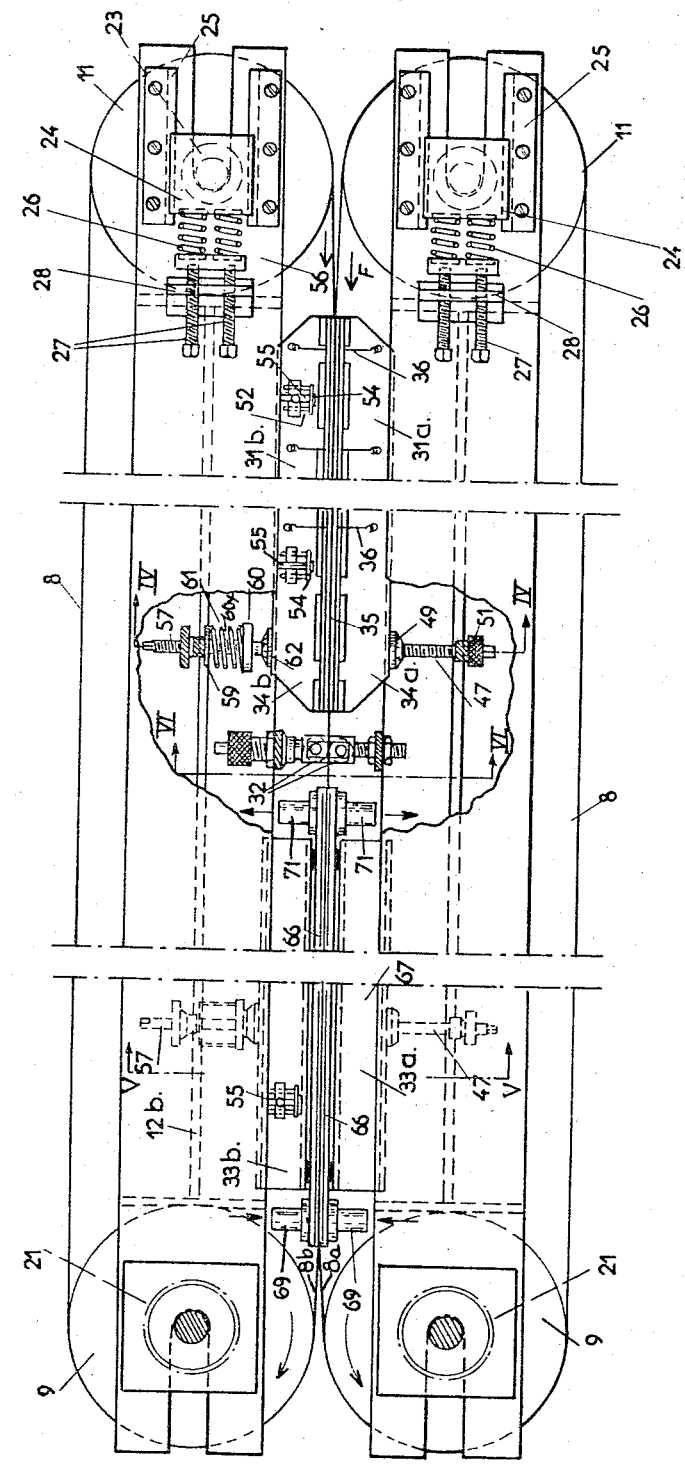

Jean-Louis Pierre, Grand Couronne, France, assignor to Potasse & Engrais Chimiques, Paris, France, a societe anonyme of France
Filed July 30, 1963, Ser. No. 298,692
Claims priority, application France, Aug. 21, 1962, 907,356, Patent 1,367,424
16 Claims. (Cl. 53—373)

This invention relates to a machine for the continuous sealing of thermoplastic material.

The machine in accordance with this invention is constructed to heat seal the open end of bags made of thermoplastic material and more particularly bags filled with powder or granular substances, fertilizers for instance.

The tightness of thermoplastic bags insures a suitable packing for substances sensitive to atmospheric moisture such as fertilizers and, therefore, the use of such bags is very desirable for commercial purposes.

However, the sealing of the openings of thermoplastic bags encounters great difficulties when the substance contained therein is in form of powder or grains. During heat sealing some particles remain confined between the two sides of the bags and the sealing of the seam becomes discontinuous so that the bags are not tight. The presence of particles between the two sides of the bag openings is all the more to be feared because during handling of thermoplastics the latter become electrostatically charged.

The object of the present invention is to provide a tight closing of thermoplastic bags by heat sealing after filling and without prior removing of the dust from the inner sides to be sealed.

The sealing machine of the invention comprises a frame which supports two endless belts mounted on rollers having parallel axes and maintained in surface contact on part of their travel, and at least one pair of heating shoes and at least one pair of cooling shoes. The heating and the cooling shoes are placed in succession on either side of the portion of the belts in surface contact. A motor is provided to move the two belts at the same speed and the bag openings to be sealed travel there-between.

A feature of the invention is to provide at least one shoe of each pair to hang freely from the frame and to be urged against the other shoe by means of a holding device.

A further feature of the invention lies in the provision of endless belts made of wire cloth and particularly of wire gauze with relatively fine mesh.

According to an advantageous embodiment of the invention the heating shoes comprise a channel bar (U-shaped) supporting a block made of copper or the like, in one or several parts, which transmits the heat to the endless belts by its outer face; a sole made of refractory material and provided with electrical resistances is maintained in contact with the inner face of the block.

One of the so-formed heating shoes of each pair is hung by a vertically disposed suspending member connecting that shoe with a stirrup secured to an adjustable arm fitted on the frame of the machine and that shoe also is urged against the opposite shoe of the pair by means of a resiliently mounted rod, this latter shoe being fixed on the frame and adjustable thereon.

Best operating conditions of the machine are thus readily obtained.

Further advantages of the invention will be apparent from the following description and drawings.

The drawings hereto attached given for purposes of illustration but not limitation represent a preferred embodiment of a sealing machine for thermoplastic material bags in accordance with the present invention.

The machine hereinafter described and shown on the drawings comprises one pair of heating shoes and one pair of cooling shoes. It is to be understood that the machine may also be constructed with two or more pairs of heating shoes and two or more pairs of cooling shoes. In the machine, as shown in the drawings, one shoe of each pair is suspended and the opposite shoe is fixed. If desired, both shoes of a pair may be suspended, and then they may be urged against each other by means of springs.

FIGURE 1 is a side view of the machine, a portion thereof being broken away to show the construction thereof.

FIGURE 2 is the corresponding front view, a portion thereof being also broken away.

FIGURE 3 is a larger scale top plan view showing the sealing belts and associated elements, with a portion thereof broken away.

Figure 4:
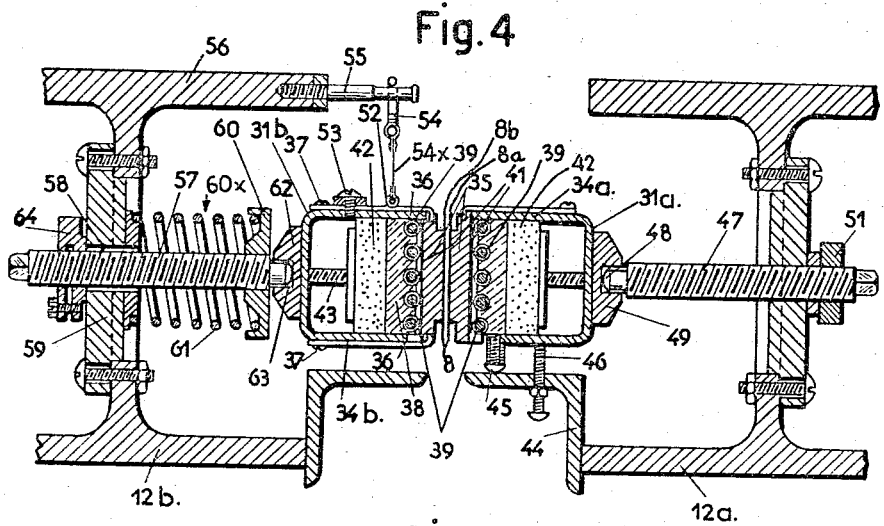
FIGURE 4 is a larger scale cross-sectional view, the portion of the section being indicated by the line IV—IV of FIGURE 3.

The machine as shown on the drawings for sealing thermoplastic bags (filled with fertilizer, for example) comprises a base 1 movable on live rollers 2. On base 1 is mounted a frame 3 in which the electric motor for driving the sealing belts is enclosed.

The frame 3 may be raised or lowered by means of screws 81 fitted in brackets 82 fixed to the frame and bearing on support columns 83 which are part of rolling-base 1.

On each side of frame 3 screws are fitted in slots 84 of support columns 83 and provided with wingnuts 85. When frame 3 is placed at desired height, nuts 85 are screwed up tight so as to secure the frame.

The upper part of frame 3 forms a shoulder 5 which is covered by a casing 6.

On shoulder 5 is mounted the sealing device comprising essentially two endless belts 8 rotating horizontally on vertical axis rollers 9 and 11 supported by two parallel longitudinal girders 12a and 12b having an I cross section attached to shoulder 5 by connections 13.

In accordance with the invention, belts 8 are made of wire cloth and preferably wire gage with fine mesh. For example, good results were obtained with steel, stainless steel or brass wires having a diameter comprised between about 0.18 and 0.22 mm. and forming a network of 400 mesh per square centimeter.

In order to prevent the thermoplastic material of the bags when softened by heat from sticking to belts 8, the surface of belts 8 is preferably coated with an antiadhesive agent such as polytetrafluoroethylene, on the side coming into contact with the bags to be sealed. Such coating may be, for instance, effected by spraying.

Each belt 8 rotates on rollers 9 and 11 arranged so that the two belts, as they travel, come into contact on their inner flights, 8a, 8b.

Rollers 9 which have fixed parallel axes are driving rollers; they are actuated in synchronism by motor 4 by means of a transmission chain 14, which is maintained taut by an idler tightener roller 15. The link chain 14 drives sprocket 16. The motion is transmitted from sprocket 16 to two sprockets 18 mounted for rotation on shoulder 5 by means of bevel gears 17. Sprockets 18 drive, by means of link chains 19, two sprockets 21 mounted on shafts of rollers 9. The bevel gears 17 are arranged so that rollers 9 rotate in opposite directions, guiding belts 8 in a diverging way; that is, the inner flights 8a and 8b of the two belts 8 travel in the same linear direction, as indicated by the arrow F (see FIG. 3).

Rollers 11 are idling rollers and are adjustable to tighten belts 8 and maintain them under desired tension. For such purpose studs 23, on which rollers 11 rotate (FIGURE 3), are supported by bearings 24 which are slidable in guides 25 fixed on the girders 12a and 12b. Bearings 24 are urged by springs 26 which maintain a suitable tension between rollers 11 and rollers 9. Tightness or tension of springs 26 is adjusted by screws 27 fitted on a support 28.

Along the inner flights 8a and 8b of travelling belts 8, between rollers 9 and rollers 11, one pair of heating shoes 31a and 31b, a pair of pressure rollers 32a and 32b and one pair of cooling shoes 33a and 33b, are mounted in succession in the direction of arrow F.

Heating shoes 31a and 31b are of similar construction but attached to the frame in different manner.

Heating shoes 31a and 31b comprise essentially (FIGURE 4) a metal frame, 34a or 34b, which is U-shaped in section; the open ends of which, adjacent the inner flights 8a and 8b of the belts 8, are closed by means of heating blocks 35 made of copper or the like maintained in place by hook members 36 which in turn are held in place on the U-shaped frames by screws 37. Inside the U-frame (see for example 34b) is mounted a refractory sole 38 in which are fitted electric coil resistances 39 contiguous to the surface level of sole 38, and separated from block 35 by an insulating sheet 41 of mica or the like. Adjacent to sole 38 on the opposite side from block 35 are mounted heat insulating elements 42 held in place by adjustable screw bolts 43. The blocks 35, held by hooks 36, are urged toward the inner flights of belts 8 by screw bolts 43.

Frame 34a of shoe 31a bears by means of fingers 45 on the horizontal flange of an angle bar 44 fixed to girder 12a. The inclination of shoe 31a may be adjusted by means of threaded screws 46 fitted through threaded bores in the horizontal flange of angle bar 44. Furthermore, shoe 31a is pressed and urged toward the inner flights 8a and 8b of belts 8 by a device which comprises a threaded rod 47 terminating in a spherical head 48 set in a socket of block 49 engaging the transversal branch of U-frame 34a. Rod 47 and therefore the corresponding position of shoe 31a is adjusted by means of a nut 51. It may be noted here that the shoe 31a, when adjusted to position, remains fixed.

Frame 34b of shoe 31b comprises fastening brackets 52 held by screws 53 and brackets 52 which are connected to stirrups 54 by means of vertically disposed suspending straps 54x; the straps being hingedly attached at their upper ends to the stirrups 54 and at their lower ends to the brackets 52. The stirrups 54 are secured to arms 55 threadedly mounted on upper cross bar on flange 56 of girder 12b. Stirrups 54 are adjusted to be disposed in the vertical plane in which the centre of gravity of the shoe lies, so that the shoe is in suspended neutral equilibrium. That is, the heating shoe 31b (see FIGS. 3 and 4) suspended from stirrups 54 by the suspending straps 54x will hang freely in a given normal position when not disturbed but is free to swing within limits from its normal position when subjected to a force, or forces, urging the shoe to move from its normal suspended position.

Shoe 31b is provided with a yieldable pushing device 60x which comprises a threaded rod 57, extending through a bore 58 of larger diameter and sliding freely in the bore 58 of a plate 59 fixed on the bored web of girder 12b. Rod 57 is urged against shoe 31b by spring 61 confined between plate 59 and spring retainer washer 60. A socket block 62 receives spherical head 63 of rod 57 and transmits the pressure to U-frame 34b. Travel of rod 57 towards shoe 31b is limited by means of a nut 64. Now, it will be seen that the shoe 31b being suspended in neutral equilibrium may swing on the suspending members 54x from stirrups 54 permitted by the yieldable device 60x within limits so that the face of the heater block 35 of shoe 31b can be displaced from its vertical normal free hanging position. This is an important and advantageous feature of the sealing machine because it permits the accommodation of different thicknesses and irregularity of the areas of the plastic bags that are to be heat sealed.

Cooling shoes 33a and 33b (see FIG. 5) are attached in an analogous manner as described above for the heating shoes. The cooling shoes comprise hollow elongated blocks 66, made of copper for example, fixed to frames 67 by screws 68. Hollow blocks 66 are cooled by water circulation therein, fed by conduits 69 and discharged by conduits 71.

Figure 5:
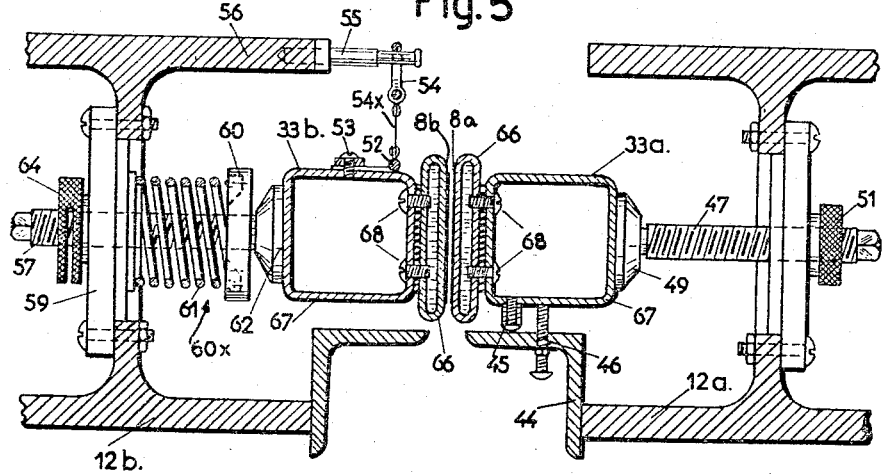
FIGURE 5 is a cross-sectional view on the line V—V of FIGURE 3.
Figure 6:
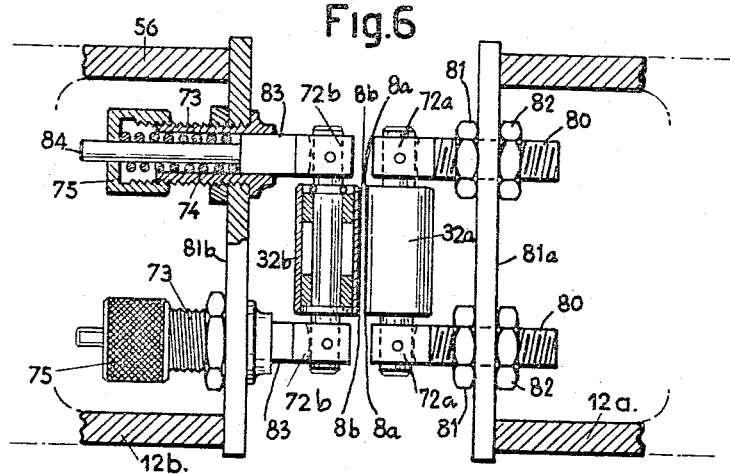
FIGURE 6 is a cross-sectional view on the line VI—VI of FIGURE 3.

Referring to FIG. 5, U-shaped frame 33b to which is secured a cooler block 66, is suspended from stirrups 54 by means of vertically disposed suspending straps 54x in turn secured to bracket 52 fixed to the frame 33b. A yieldable pushing device 60x urges the cooling block secured to the frame toward the inner flights 8a and 8b of the travelling belts. The opposite cooler block 66, secured to U-shaped frame 33a is maintained in adjusted fixed position by the screws 45, 46 and the threaded rod 47 and nut 51, as described above in connection with the mounting of heater shoe 31a.

Pressure roller 32a is mounted for rotation in bearings 72a. Bearings 72a are secured to threaded arms 80 extending through threaded bores in plate 81a which is fastened to the flanges of girder 12a. The arms 80 are maintained in adjusted position by means of nuts 81, 82. Pressure roller 32b is mounted for rotation in bearings 72b which are secured to arms 83, each of which is slidably mounted in an externally threaded sleeve 73 which in turn is threaded in a bore in plate 81b. A yieldable helical spring 74 mounted within the sleeve around the shank 84 of arm 83 urges the bearing 72b and roller 32b toward the opposite roller 32a. Tension on the spring 74 may be adjusted by a threaded cap member 75, thus to adjust the pressure between pressure rollers 32a, 32b.

When it is desired to use the sealing machine described hereabove, the latter is moved near to a conveyor on which are transported the bags to be sealed. Frame 3 is adjusted to height so that the upper portions of the bags to be sealed pass between the flights 8a, 8b of the two belts 8. Motor 4 is placed in operation and synchronized with the speed of the bag conveyor so that the lineal speed of belts and bags is absolutely the same. When the bags are fed to the machine by the conveyor their open upper ends pass between rollers 11 and are gripped by the inner flights of belts 8 which are heated to sealing temperature during their travel between blocks 35 by conduction of heat from the electric resistance coils 39.

Electrical resistances 39 are heated so that the temperature of blocks 35 is, for example, between about 150° and 230° C., or to a suitable temperature depending upon nature and thickness of material to be sealed. The sealing temperature also depends on the travelling speed of belts 8. For example, when sealing polyethylene bags having a wall thickness of 0.25 mm., a rate of about 1000 bags per hour was obtained with a temperature within the range of between about 180° and 210° C. The temperature is adjusted by means of a thermostatically controlled device (not shown) including thermocouples fixed to the heating shoes.

The machine in accordance with the invention has an important advantage for the safety of the workmen dealing with it, inasmuch as electrical resistances 39 may be supplied with low voltage current, for example 24 to 42 volts. Heat power requirements are between about 2000 and 4500 watts.

The method of suspension described hereabove for shoes 31b insures the maintenance of a uniform pressure between shoes 31a and 31b; the means for adjustment of transversal position of shoe 31a allows to place blocks 35 in correct position on either side of the vertical plane of symmetry common to rollers 9 and rollers 11. Such a disposition of the shoes makes it possible to obtain good sealing results notwithstanding small variations in the thickness of bag walls being sealed.

Due to the suspension of shoes in neutral equilibrium as described above and the use of wire gauze belts, a relatively wide sealing seam is obtained while avoiding deformation of the belts. This combination of features permits continuous operation for a long period without interruption of operation and loss of time required for replacing belts.

The use of wire gauze for the endless belts 8, shoes 31a and 31b and pressure rollers 32a, 32b will result in pressure on the thermoplastic material at certain points only and at these points, the pressure is great and interpenetration of the bag walls softened by heat results. Due to this strong pressure at the points where the wires engage the surface of the thermoplastic, a perfect sealing is obtained even in presence of dust on the bag walls. The width of the sealing seam being sufficiently large (about 30 to 40 mm.) prevents any lack of tightness even though discontinuities in the sealing may be caused by dust particles.

The cooling shoes restore to the bag walls their initial consistency thereby achieving the desired sealing.

By mounting the machine on rollers 2 the machine may be readily moved from one working place to another.

Inasmuch as the frame 3 is vertically adjustable, the machine is readily adapted for sealing bags of different sizes. In certain instances pressure rollers 32 may not be necessary and in such instances, may, if desired, be discarded.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A machine for heat sealing of thermoplastic material such as open ends of filled bags which comprises a frame on which are mounted two endless belts supported by rollers having parallel axes and maintained in contiguous relationship on a part of their travel, at least a pair of heating shoes and at least a pair of cooling shoes, means to freely hang in neutral equilibrium at least one shoe of each heating pair from the machine frame, yieldable pushing means to urge said at least one shoe against the other, and motor means to move in synchronism the two belts between which the bag openings to be sealed travel.

2. A machine according to claim 1 in which the endless belts are made of wire cloth.

3. A machine according to claim 2 in which the wire cloth of endless belts is made of wire gauze with fine mesh which allows to obtain a relatively wide seam insuring the tight sealing of bag openings in spite of the presence of dust.

4. A machine according to claim 2 in which the wire cloth of the endless belts, on the side where the belts are in surface contact with the material to be sealed, is coated with an anti-adhesive and heat resistive substance, such as a polytetrafluoroethylene layer deposited thereon by spraying.

5. A machine according to claim 1 in which each heating shoe comprises a channel bar (U iron) supporting a block made of copper or the like, which transmits the heat to the endless belts by its outer face, the inner face of this block being in contact with a refractory sole provided with electrical resistances.

6. A machine according to claim 1 in which said means to freely hang comprises stirrups attached to arms fitted on the machine frame, and said yieldable pushing means to urge said at least one shoe against the opposite shoe comprises a resiliently mounted rod, this latter shoe being fixed on the machine frame and adjustable thereon.

7. A machine according to claim 1 in which the machine frame is mounted on live rollers, which allows to move the machine from one working point to another.

8. A machine according to claim 1 in which the machine frame is adjustable to height to suit bags of different sizes.

9. A machine for heat sealing open ends of filled bags made of thermoplastic sheet material which comprises a frame, a first pair of driven rollers and a second pair of idling rollers mounted on said frame for rotation with their axes vertically disposed, means including a motor on said frame connected to drive said first pair of rollers, a first endless travelling belt trained over a first one of said pair of driven rollers and a first one of said pair of idler rollers and having an inner flight, a second endless travelling belt trained over the second one of said first pair of driven rollers and the second one of said pair of idler rollers and having an inner flight, said rollers being positioned to maintain said inner flights of said two endless belts in contiguous relationship when said belts travel in response to rotation of said driven rollers, at least one pair of oppositely disposed heating shoes each of which engages an inner flight of one of said belts and at least one pair of oppositely disposed cooling blocks each of which engages an inner flight of one of said belts, means mounting said heating shoes and cooling blocks on said frame, the means mounting the first one of said pair of heating shoes on said frame comprising supporting members secured to a fixed member of said frame above said first heating shoe and freely hanging suspending members connected at one end thereof to said supporting members and connected at the other end thereof to said first heating shoe, said first heating shoe being suspended on said frame in freely hanging neutral equilibrium.

10. A machine according to claim 9 in which the means mounting said hanging shoe comprises arms mounted on a rigid part of said frame above the suspended shoe, said arms being adjustable toward and away from the vertical plane between the inner flights of said belts, stirrups mounted on said arms, suspending straps connected at their upper ends to said stirrups and depending therefrom and brackets on said shoe, to which the lower end of said straps are connected, and means including a yieldable spring mounted on said frame engaging said suspended shoe and resiliently urging said shoe toward the inner flights of said belts.

11. A machine according to claim 10 in which the shoe oppositely disposed from said suspended shoe is adjustably mounted on said frame in fixed position.

12. A machine according to claim 11 in which said belts are made of metallic wire mesh and the surfaces of said belts which contact each other are coated with an antiadhesive coating.

13. A machine according to claim 9 in which said cooling blocks are mounted on said frame in the same manner and by like mounting means as said heating shoes.

14. A machine according to claim 1 in which said means to freely hang comprises stirrups attached to arms fitted on the machine frame.

15. A machine according to claim 1 in which said yieldable pushing means to urge said at least one shoe against the opposite shoe comprises a resiliently mounted rod.

16. A machine according to claim 14 in which said yieldable pushing means to urge said at least one shoe against the opposite shoe comprises a resiliently mounted rod.

References Cited by the Examiner

UNITED STATES PATENTS

| 2,606,850 | 8/1952 | Piazze | 53—373 X |
|---|---|---|---|
| 3,131,623 | 5/1964 | Seefluth | 53—373 X |
| 3,140,971 | 7/1964 | Crescenzo et al. | 53—388 X |
| 3,187,484 | 6/1965 | Smith | 53—388 X |

FOREIGN PATENTS 114,269  11/1941  Australia.

TRAVIS S. McGEHEE, *Primary Examiner.*